(12) United States Patent
Lee et al.

(10) Patent No.: US 9,796,127 B2
(45) Date of Patent: Oct. 24, 2017

(54) APPARATUS FOR FORMING A WINDOW OF A DISPLAY PANEL

(71) Applicant: SAMSUNG DISPLAY CO., LTD., Yongin-si, Gyeonggi-do (KR)

(72) Inventors: Jung Min Lee, Suwon-si (KR); Young Chun Park, Cheonan-si (KR); Jong Soo Kim, Asan-si (KR); June Beom Park, Cheonan-si (KR); Min Soo Kim, Suwon-si (KR); Chan Hae Hwang, Yeongju-si (KR)

(73) Assignee: Samsung Display Co., Ltd. (KR)

( * ) Notice: Subject to any disclaimer, the term of this patent is extended or adjusted under 35 U.S.C. 154(b) by 29 days.

(21) Appl. No.: 14/884,654

(22) Filed: Oct. 15, 2015

(65) Prior Publication Data

US 2016/0207818 A1 Jul. 21, 2016

(30) Foreign Application Priority Data

Jan. 20, 2015 (KR) ........................ 10-2015-0009417

(51) Int. Cl.
*B29C 51/08* (2006.01)
*B29C 51/46* (2006.01)
(Continued)

(52) U.S. Cl.
CPC ............ *B29C 51/082* (2013.01); *B29C 43/04* (2013.01); *B29C 43/52* (2013.01); *B29C 51/428* (2013.01);
(Continued)

(58) Field of Classification Search
None
See application file for complete search history.

(56) References Cited

U.S. PATENT DOCUMENTS 4,842,634 A * 6/1989 Vanaschen ............ C03B 23/035
65/106
4,913,718 A * 4/1990 Yoshimura .............. C03B 11/08
65/102

(Continued)

FOREIGN PATENT DOCUMENTS

KR 10-1997-0014993 A 4/1997
KR 10-2003-0025829 A 3/2003
(Continued)

OTHER PUBLICATIONS

T.S. Jung et al., "Effect of the Molding Conditions on Formability in Progressive Glass Molding Press," Transactions of Materials Processing, Aug. 2009, pp. 633-639, vol. 18, No. 8.
(Continued)

*Primary Examiner* — Matthew Daniels
*Assistant Examiner* — Manley Cummins, IV
(74) *Attorney, Agent, or Firm* — Innovation Counsel LLP

(57) ABSTRACT

An apparatus for forming a window of a display panel includes a mold configured to hold a plate in a concave portion, wherein the concave portion has a predetermined shape, and a transfer part configured to sequentially transfer the mold to a heating part, a forming part, and a cooling part. The heating part includes first and second heating modules respectively positioned on top and bottom portions of the mold and configured to apply heat to the top and bottom portions of the mold. The forming part is positioned above the mold and configured to jet a high-temperature gas onto the heated plate. The cooling part includes first and second cooling modules respectively positioned on the top and bottom portions of the mold and configured to cool the top and bottom portions of the heated plate. The mold is tilted at a predetermined angle relative to a horizontal plane.

20 Claims, 13 Drawing Sheets

(51) Int. Cl.
*B29C 51/42* (2006.01)
*B29C 43/04* (2006.01)
*B29C 43/52* (2006.01)
*C03B 23/03* (2006.01)
*C03B 23/035* (2006.01)
*B29K 105/00* (2006.01)
*B29L 31/34* (2006.01)
*B29C 33/34* (2006.01)
*B29C 53/04* (2006.01)
*B29C 43/58* (2006.01)

(52) U.S. Cl.
CPC .......... *B29C 51/46* (2013.01); *C03B 23/0307* (2013.01); *C03B 23/0357* (2013.01); *B29C 33/34* (2013.01); *B29C 53/04* (2013.01); *B29C 2043/046* (2013.01); *B29C 2043/5816* (2013.01); *B29K 2105/256* (2013.01); *B29K 2995/0026* (2013.01); *B29L 2031/3475* (2013.01)

(56) References Cited

U.S. PATENT DOCUMENTS

| | | | | |
|---|---|---|---|---|
| 5,066,320 A * | 11/1991 | Lehto | .................. | C03B 23/0252 65/106 |
| 5,597,397 A * | 1/1997 | Funk | ....................... | C03B 23/03 65/171 |
| 6,318,125 B1 * | 11/2001 | Diederen | ............ | C03B 23/0352 65/102 |
| 8,429,937 B2 * | 4/2013 | Malach | ................ | C03B 23/0252 65/104 |
| 2002/0020696 A1 * | 2/2002 | Kitamura | .............. | G01J 5/0003 219/390 |
| 2003/0106341 A1 * | 6/2003 | Hanada | ................ | C03B 23/0258 65/106 |
| 2004/0107729 A1 * | 6/2004 | Fukami | ................ | C03B 23/0258 65/25.4 |
| 2010/0000259 A1 * | 1/2010 | Ukrainczyk | ........ | C03B 23/0235 65/104 |
| 2011/0205485 A1 * | 8/2011 | Sonzogni | ............ | B29C 43/3642 351/124 |
| 2013/0298608 A1 * | 11/2013 | Langsdorf | ........... | C03B 23/0258 65/103 |
| 2014/0013803 A1 * | 1/2014 | Hwang | ............... | C03B 23/0305 65/32.1 |
| 2014/0348970 A1 * | 11/2014 | Matsuzuki | .............. | B29C 33/34 425/346 |
| 2015/0107305 A1 * | 4/2015 | Wei | ..................... | C03B 23/0307 65/104 |

FOREIGN PATENT DOCUMENTS

| | | |
|---|---|---|
| KR | 20-0408328 Y1 | 2/2006 |
| KR | 2004-08328 Y1 | 2/2006 |
| KR | 10-2006-0049619 A | 5/2006 |
| KR | 10-0801093 B1 | 1/2008 |
| KR | 10-1086267 B1 | 11/2011 |
| KR | 10-1121449 B1 | 3/2012 |
| KR | 10-2012-0092687 A | 8/2012 |
| KR | 10-2013-0129352 A | 5/2015 |
| KR | 10-2015-0049159 A | 5/2015 |

OTHER PUBLICATIONS

Hyung Il Kim et al., "Thermoforming Process Technique (1)," The Monthly Packaging News, Jun. 1994, pp. 104-111, No. 14.

* cited by examiner

[Heating part and cooling part]

[Forming part]

APPARATUS FOR FORMING A WINDOW OF A DISPLAY PANEL

CROSS-REFERENCE TO RELATED APPLICATION

This application claims priority to and the benefit of Korean Patent Application No. 10-2015-0009417 filed in the Korean Intellectual Property Office on Jan. 20, 2015, the entire contents of which are incorporated herein by reference.

BACKGROUND (a) Technical Field

The present disclosure generally relates to an apparatus for forming a window of a display panel.

(b) Description of the Related Art

Recently, a variety of electronic devices, such as cellular phones, navigation systems, digital cameras, e-book readers, portable game devices, and various other devices, include a liquid crystal display (LCD) or an organic light emitting diode (OLED) as a display device.

The display device typically includes a display panel which is an internal component of the display device, and a transparent cover window which is an external component of the display device. The transparent cover window is attached to a front side of the display panel such that a user can view a display on the display panel through the transparent cover window. The transparent cover window needs to be robust against external impact in order to protect the display panel on which sensitive circuitry and components may be disposed.

In recent times, touch panels integrated with a display screen have been gradually replacing conventional display devices that use a mouse or a keyboard as an input device. The surface of the transparent cover window in those touch panels is touched by a user's finger or a touch device more frequently compared to conventional non-touch mobile devices. Accordingly, the transparent cover window in those touch panels requires a higher robustness.

In addition, as portable devices having curved surfaces are being developed, there arises a need for a transparent cover window having a curved surface.

The above information disclosed in this Background section is only to enhance understanding of the background of the inventive concept and therefore it may contain information that does not form the prior art that is already known in this country to a person of ordinary skill in the art.

SUMMARY

The present disclosure generally discloses an apparatus for manufacturing a window used in a display device. In particular, the apparatus can be used to manufacture a window with both curved surfaces having a same width. Also, the manufacturing time of the window can be reduced using the above apparatus.

According to an exemplary embodiment of the inventive concept, an apparatus for forming a window of a display panel is provided. The apparatus includes: a mold having a concave portion formed therein and configured to hold a plate in the concave portion, wherein the concave portion has a predetermined shape; and a transfer part configured to sequentially transfer the mold to a heating part, a forming part, and a cooling part. The heating part includes a first heating module and a second heating module respectively positioned on a top portion and a bottom portion of the mold, and wherein the first and second heating modules are configured to apply heat to the top and bottom portions of the mold so as to heat the plate. The forming part is configured to receive the mold transferred from the heating part to the forming part by the transfer part, and wherein the forming part is positioned above the mold and configured to jet a high-temperature gas onto the heated plate, so as to form the heated plate into the predetermined shape. The cooling part is configured to receive the mold transferred from the forming part to the cooling part by the transfer part, wherein the cooling part includes a first cooling module and second cooling module respectively positioned on the top and bottom portions of the mold, and wherein the first and second cooling modules are configured to cool the top and bottom portions of the mold, so as to cool the heated plate and thereby form the window having the predetermined shape. The mold is tilted at a predetermined angle relative to a horizontal plane of the heating part, the forming part, and the cooling part.

In some embodiments, the mold may include a stopper for supporting an edge portion of the plate or window, so as to prevent the plate or window from moving downward.

In some embodiments, the predetermined angle may range from about 0° to about 30°.

In some embodiments, the mold may include a plurality of suction holes formed in the concave portion.

In some embodiments, the first heating module may include a first heater positioned above the mold for heating the mold. The second heating module may include a second heating block positioned under the mold for transferring heat to the mold, and a second heater positioned under the second heating block for heating the second heating block.

In some embodiments, the first heating module may further include a first heating block positioned between the mold and the first heater for heating the mold using heat transferred from the first heater.

In some embodiments, the first and second heating blocks may be formed of at least one of silicon carbide, stainless steel, graphite, and quartz.

In some embodiments, the first and second heaters may be infrared heaters.

In some embodiments, the apparatus may further include: a first heat shield positioned on the first heater for preventing heat generated from the first heater from being discharged to the outside; and a second heat shield positioned under the second heater for preventing the heat generated from the second heater from being discharged to the outside In some embodiments, the second heating block may include a plurality of connection holes connected with the suction holes of the mold.

In some embodiments, the forming part may further include: a forming block positioned above the mold and including a plurality of injection holes through which the high-temperature gas is jetted; a third heating block positioned on the forming block for transferring heat to the forming block; a third heater positioned on the third heating block for heating the third heating block; a high-temperature gas supply module connected to the forming block for supplying a high-temperature gas to the forming block; a fourth heating block positioned under the moved mold for transferring heat to the mold; and a fourth heater positioned under the mold for heating the fourth heating block.

In some embodiments, the forming block may have a convex portion corresponding to the predetermined shape.

In some embodiments, the heating part may include a plurality of heating parts, the heating parts may be disposed in parallel and heating temperatures of the heating parts may increase in a direction in which the mold is transferred.

In some embodiments, the cooling part may include a plurality of cooling parts, the cooling parts may be disposed in parallel and cooling temperatures of the heating parts may decrease in a direction in which the mold is transferred.

In some embodiments, the transfer part may include a pair of rails, and the heating part, the forming part, and the cooling part may be positioned along the pair of rails.

In some embodiments, the pair of rails may include fixing grooves for fixing the mold in place.

According to another exemplary embodiment of the inventive concept, an apparatus for forming a window of a display panel is provided. The apparatus includes: a mold having a concave portion formed therein and configured to hold a plate in the concave portion, wherein the concave portion has a predetermined shape, and a transfer part configured to transfer the mold between a temperature control part and a forming part. The temperature control part includes a first temperature control module and a second temperature control module respectively positioned on a top portion and a bottom portion of the mold, and wherein the first and second temperature control modules are configured to heat the top and bottom portions of the mold so as to heat the plate. The forming part is configured to receive the mold transferred from the temperature control part to the forming part by the transfer part, and wherein the forming part is positioned above the mold and configured to jet a high-temperature gas onto the heated plate, so as to form the heated plate into the predetermined shape. The temperature control part is further configured to receive the mold transferred from the forming part to the temperature control part by the transfer part, and wherein the first and second temperature control modules are configured to cool the top and bottom portions of the mold, so as to cool the heated plate and thereby form the window having the predetermined shape. The mold is tilted at a predetermined angle relative to a horizontal plane of the heating part, the forming part, and the cooling part.

In some embodiments, the first temperature control module may include a first temperature controller positioned above the mold for heating or cooling the mold. The second temperature control module may include a second temperature control block positioned under the mold for exchanging heat with the mold, and a second temperature controller positioned beneath the second temperature control block for heating or cooling the second temperature control block.

In some embodiments, the first temperature control module may further include a first temperature control block positioned between the mold and the first temperature controller for heating or cooling the mold using heat transferred from the first temperature controller.

In some embodiments, the first and second temperature control blocks may be formed of at least one of silicon carbide, stainless steel, graphite, and quartz.

In some embodiments, the apparatus may further include: a third heat shield positioned on the first temperature controller for preventing heat generated from the first temperature controller from being discharged to the outside; and a fourth heat shield positioned beneath the second temperature controller for preventing heat generated from the second temperature controller from being discharged to the outside.

According to one or more of the above embodiments, a window with both sides having the same width can be formed using the apparatus since the mold is tilted at a predetermined angle relative to a horizontal plane during the manufacturing process.

Also, the components in the apparatus can be simplified by heating and cooling the mold using one temperature control unit.

In addition, heating time and cooling time can be reduced by using a plurality of heating parts and cooling parts.

DETAILED DESCRIPTION

Figure 1:
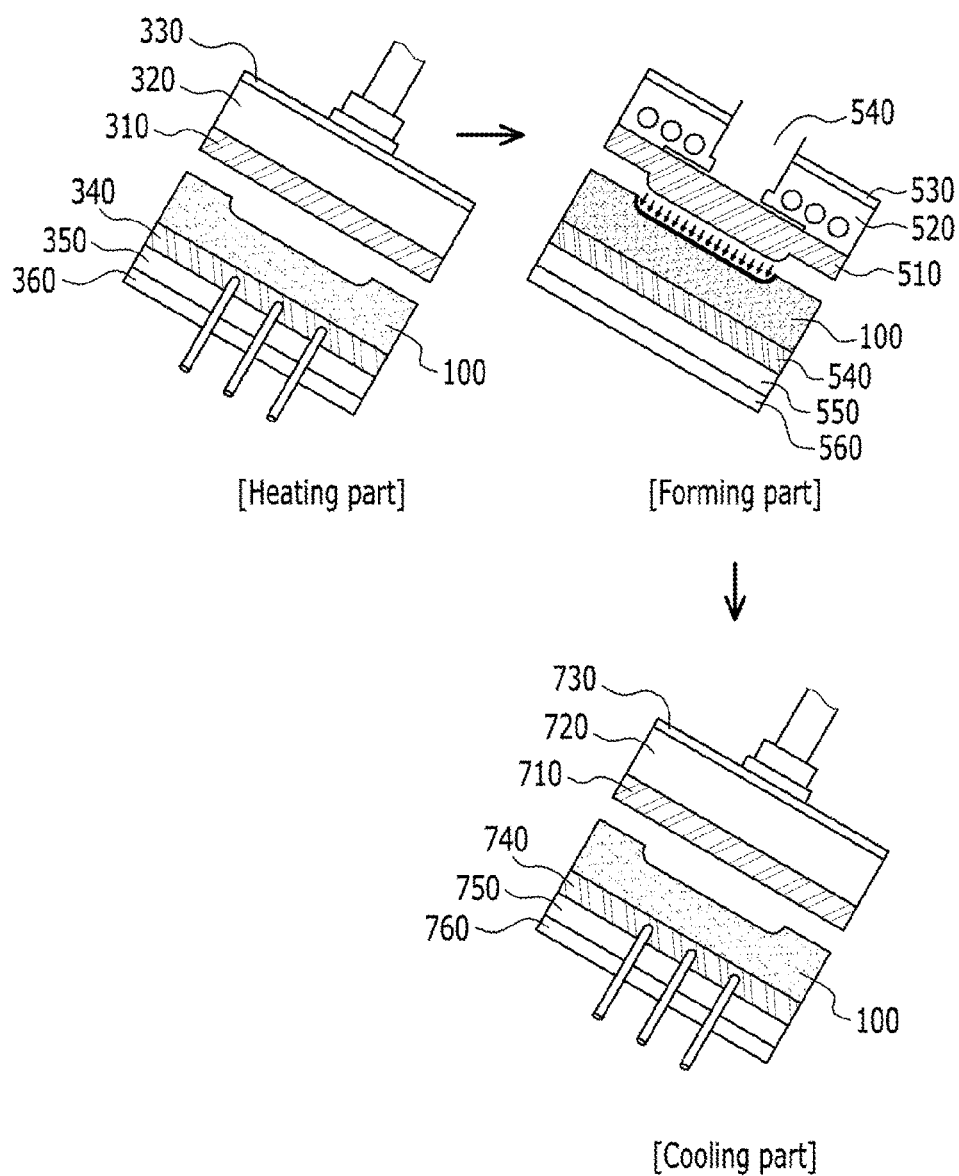
FIG. 1 is a schematic diagram of an apparatus for forming a window according to a first exemplary embodiment.

The inventive concept will be described more fully herein with reference to the accompanying drawings, in which exemplary embodiments are shown. As those skilled in the art would realize, the embodiments may be modified in various ways without departing from the spirit or scope of the present disclosure. Rather, the embodiments are provided to make the disclosure thorough and complete, and to sufficiently convey the spirit and scope of the inventive concept to a person of ordinary skill in the art.

In the drawings, the thickness of layers, regions, etc., may be exaggerated for clarity. It will be understood that when an element such as a layer, film, region, or substrate is referred to as being "on" another element, it can be directly on the other element or intervening elements may also be present. Like reference numerals designate like elements throughout the specification.

FIG. 1 is a schematic diagram of an apparatus for manufacturing a window according to a first exemplary embodiment. The apparatus of FIG. 1 can be used to manufacture a window W of a display panel. The window W may be made of glass or any other appropriate transparent material. The window W can be manufactured in a desired shape by passing a mold 100 containing a plate sequentially through a heating part 300, a forming part 500, and a cooling part 700. The window W is formed from the plate and is disposed in the mold 100. The mold 100 is tilted at a predetermined angle relative to a horizontal plane of the heating part 300, the forming part 500, and the cooling part 700 during the manufacture of the window W.

Referring to FIGS. 1, 7, 8, 11, and 12, the apparatus for manufacturing the window W according to the first exemplary embodiment includes the mold 100, the heating part 300, the forming part 500, the cooling part 700, and a transfer part 900.

The heating part 300, the forming part 500, and the cooling part 700 may be disposed along a pair of rails 910 of the transfer part 900, as described later in the specification.

The heating part 300 (not shown) may be disposed in a region I of the pair of rails 910. The forming part 500 (not shown) may be disposed in a region II of the pair of rails 910. The cooling part 700 (not shown) may be disposed in a region III of the pair of rails 910.

Figure 12:
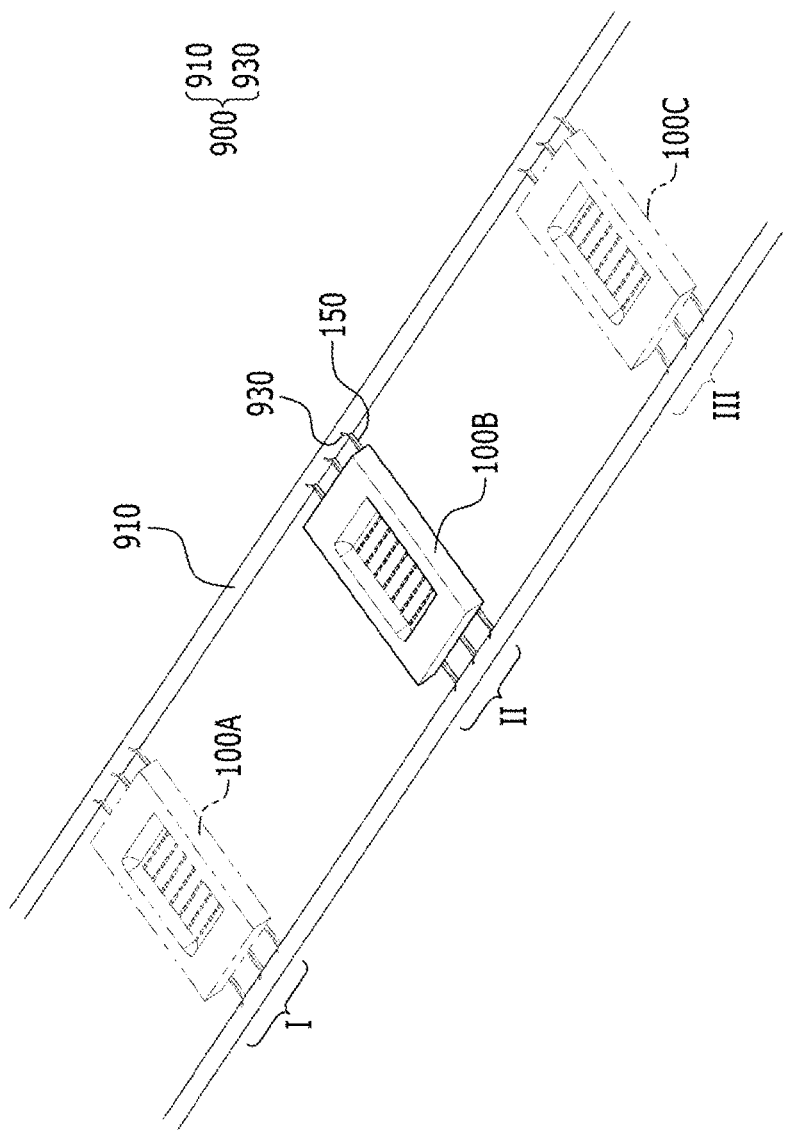
FIG. 12 illustrates a process in which the mold is moved along a transfer part of the apparatus of FIG. 1.

That is, the heating part 300, the forming part 500, and the cooling part 700 may be respectively disposed in the regions I, II, and III of the pair of rails 910. As shown in FIG. 12, the mold 100 is moved along the pair of rails 910 and positioned sequentially in the regions I, II, and III according to a manufacturing process of the window W.

To manufacture the window W in a desired shape, the mold 100 containing the plate undergoes a heating process and a high-temperature gas is then jetted onto the heated plate, followed by a cooling process.

The mold 100 containing the plate is positioned in the heating part 300 disposed in the region I, so as to heat the plate. After the plate is heated, the mold 100 is moved to the forming part 500 disposed in the region II, so as to form the heated plate into the shape of the window W. After the heated plate is formed into the shape of the window W, the mold 100 is then moved to the cooling part 700 disposed in the region III, so as to cool the formed heated plate to form the window W. The aforementioned manufacturing process will be described in detail later in the specification.

A detailed description of the mold 100, the heating part 300, the forming part 500, the cooling part 700, and the transfer part 900 is provided below.

First, the mold 100 will be described with reference to FIGS. 2, 3, 4, 5, and 6.

Figure 2:
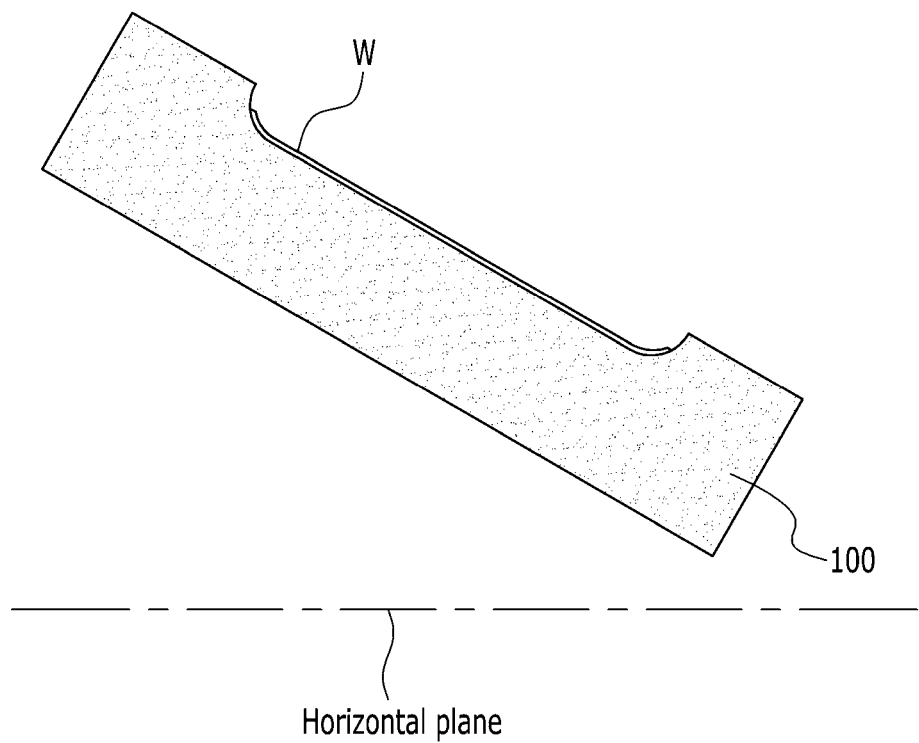
FIG. 2 is a cross-sectional view of a mold of the apparatus of FIG. 1.
Figure 3:
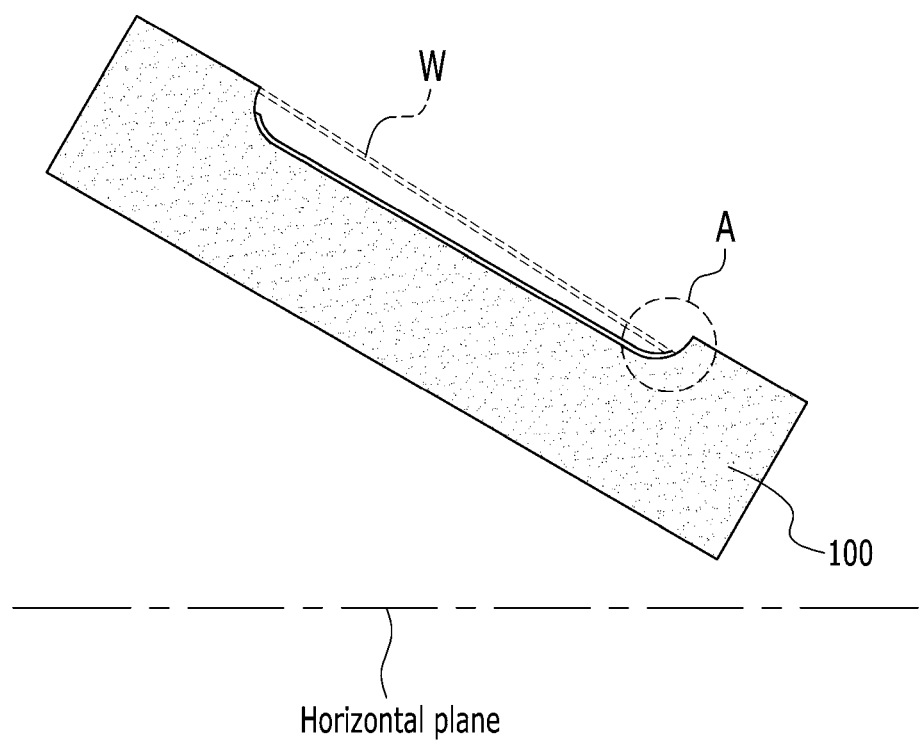
FIG. 3 illustrates a process in which a window is disposed in the mold.

Referring to FIG. 2, the mold 100 is configured to hold the plate from which the window W is formed. Specifically, the mold 100 has a concave portion corresponding to the final shape of the formed window W. The plate is passed through the heating part 300 and the forming part 500, and subsequently formed into the window W corresponding to the shape formed in the mold 100.

The mold 100 is tilted at a predetermined angle relative to a horizontal plane. In some embodiments, the mold 100 may be tilted at an angle ranging from about 0 degree to about 30 degrees relative to the horizontal plane.

Figure 4:
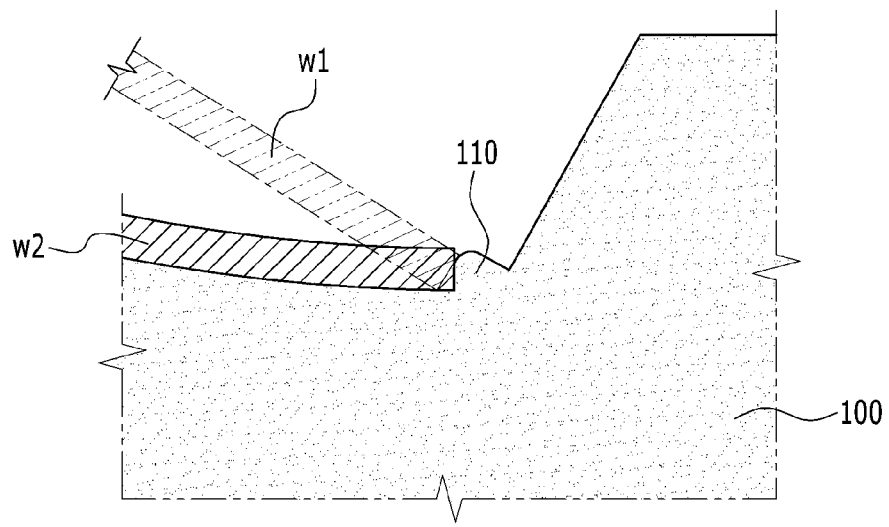
FIG. 4 is an enlarged view of region A of FIG. 3.

As shown in FIG. 4, a stopper 110 is formed in the concave portion of the mold 100. The stopper 110 prevents the plate (or window W1, W2) from moving downward when the mold 100 is tilted. The stopper 110 may be formed in the shape of a protrusion.

According to the first exemplary embodiment, the mold 100 is tilted at a predetermined angle relative to a horizontal plane such that both sides of the window W are curved having the same width.

It is noted that when heating and forming are performed with a mold disposed in the horizontal direction, both curved sides of the resulting window often do not have the same width. For example, the width of a curved side may be wider or narrower than the width of the other curved side.

However, when the mold 100 is tilted at a predetermined angle relative to the horizontal plane with the stopper 110 disposed therein, the window W with both sides having the same width can be formed, as disclosed above in the first exemplary embodiment.

As shown in FIG. 4, a side portion of a window W2 is constrained from moving downward in the direction of gravity by the stopper 110. Accordingly, both of the curved sides of the window W2 can be maintained having the same width.

Figure 5:
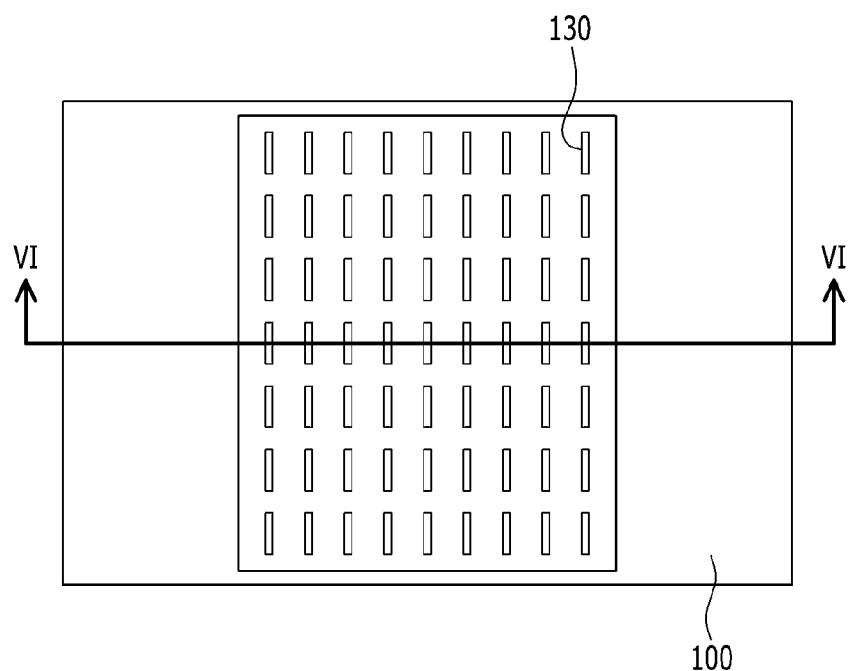
FIG. 5 is a top plan view of the mold of the apparatus of FIG. 1.
Figure 6:
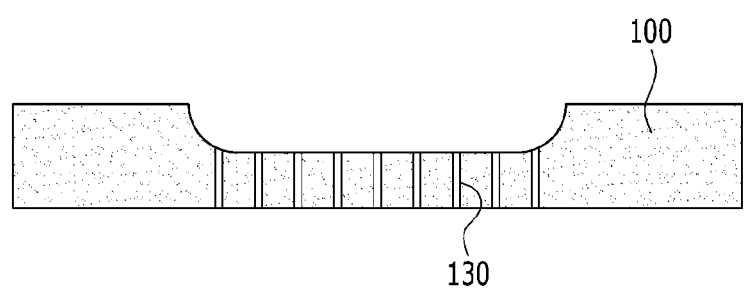
FIG. 6 is a cross-sectional view of the mold taken along line VI-VI of FIG. 5.

Referring to FIGS. 5 and 6, a plurality of suction holes 130 are formed in the mold 100. The suction holes 130 allow the plate to be disposed in contact with the inside of the mold 100 along the concave portion of the mold 100. Specifically, the plate can be disposed in contact with the inside of the mold 100 by sucking air through the suction holes 130 from the inside to the outside of the mold 100.

Figure 7:
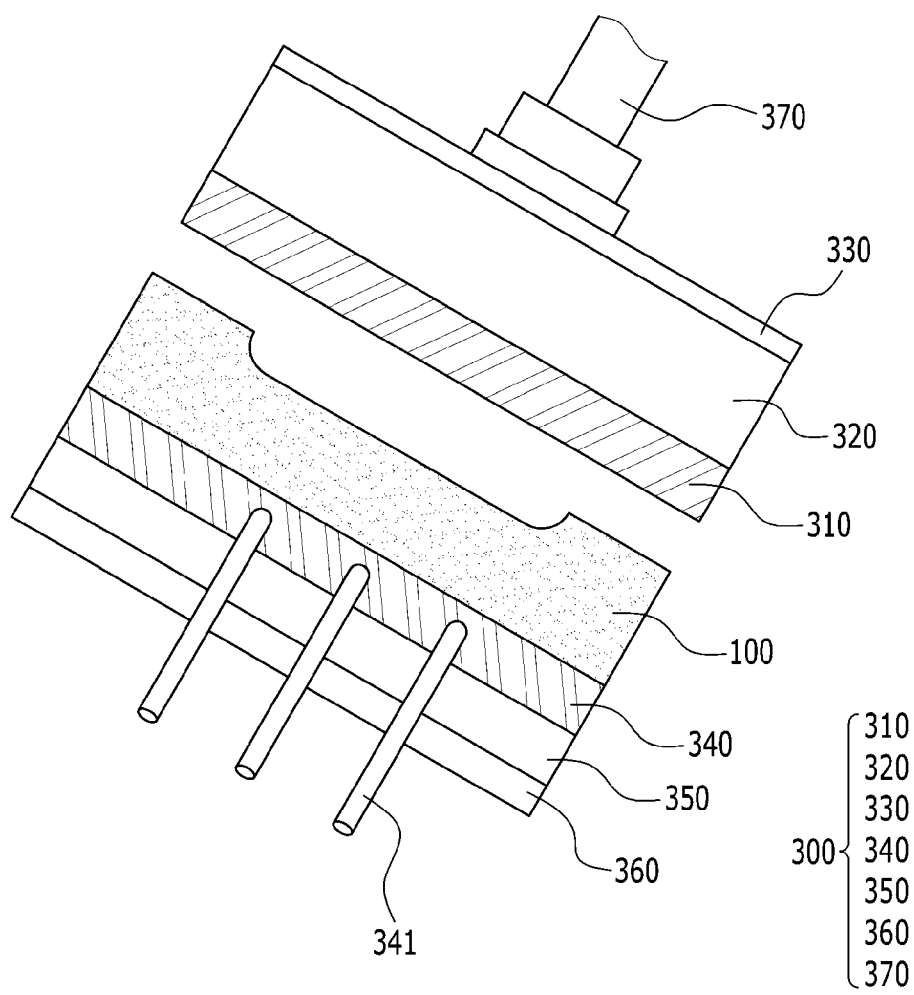
FIG. 7 is a cross-sectional view of a heating part of the apparatus of FIG. 1.

Referring to FIG. 7, the mold 100 in which the plate is disposed is located in the heating part 300. That is, in the apparatus according to the first exemplary embodiment, the mold 100 is moved to the heating part 300 in order to heat the plate.

According to the first exemplary embodiment, the heating part 300 includes first and second heating modules. The first and second heating modules gradually heat the mold 100 to a temperature at which the window W can be formed. The first and second heating modules are described in further detail below.

The first heating module is positioned above the mold 100 and heats the mold 100. The first heating module includes a first heating block 310 and a first heater 320.

Specifically, the first heater 320 for heating the mold 100 is positioned above the mold 100. The first heater 320 can heat the mold 100 through radiation. The first heater 320 may be an infrared heater. For example, the first heater 320 may be a halogen lamp.

FIG. 7 illustrates the first heating block 310 being positioned between the mold 100 and the first heater 320. In some alternative embodiments, the first heating block 310 may be omitted, and the first heater 320 may directly heat the mold 100.

The first heating block 310 may be positioned between the mold 100 and the first heater 320. The first heater 320 may heat the first heating block 310 first. Heat is then uniformly transferred to the mold 100 through the first heating block 310. That is, the plate disposed in the mold 100 can be uniformly heated using the first heating block 310.

The first heating block 310 can be made of at least one of the following materials: silicon carbide, stainless steel, graphite, or quartz. When the first heating block 310 is made of at least one of the above materials, heat from the first heater 320 can be uniformly transferred to the mold 100.

A first heat shield 330 is positioned on the first heater 320. The first heat shield 330 can prevent heat generated from the first heater 320 from being discharged to the outside. Accordingly, loss of heat generated from first heater 320 can be minimized.

The first heat shield 330 may be made of ceramic. However, the material of the first heat shield 330 is not limited thereto. For example, the first heat shield 330 can be made of any known material that can effectively prevents heat loss, that is, discharge of heat.

In addition, a first moving part 370 can be connected to an upper part of the first heat shield 330. The first moving part 370 can move the first heating module. For example, the first moving part 370 can move the first heating block 310, the first heater 320, and the first heat shield 330 upward or downward.

For example, when the mold 100 is moved to the heating part 300, the first moving part 370 moves the first heating module upward. Then, when the mold 100 is stopped at a specific position, the first moving part 370 moves the first heating module downward.

A second heating module for heating the mold 100 is positioned beneath the mold 100. The second heating module includes a second heating block 340 and a second heater 350.

The second heating block 340 transfers heat to the mold 100 and is positioned beneath the mold 100. The second heating block 340 can be heated by the second heater 350, and then uniformly heat the mold 100. That is, the second heating block 340 can uniformly heat the plate disposed in the mold 100, similar to the first heating block 310.

The second heating block 340 is disposed in contact with the bottom of the mold 100. When the second heating block 340 is disposed in contact with the mold 100, heat can be uniformly transferred from the second heating block 340 to the mold 100.

A plurality of first connection holes (not shown) are formed in the second heating block 340. The plurality of first connection holes are connected with the suction holes 130 of the mold 100 so that air from the inside of the mold 100 can be discharged to the outside.

The plurality of first connection holes (not shown) may be connected to a pump and the like through first connecting pipes 341.

The second heating block 340 may be made of at least one of the following materials: silicon carbide, stainless steel, graphite, or quartz. When the second heating block 340 is made of at least one of the above materials, heat from the second heater 350 can be uniformly transferred to the mold 100.

The second heater 350 is positioned beneath the second heating block 340. The second heater 350 comes into contact with the second heating block 340 and heats the second heating block 340.

The second heater 350 may be an infrared heater. For example, the second heater 350 may be a halogen lamp.

A second heat shield 360 is positioned beneath the second heater 350. The second heat shield 360 can prevent heat generated from the second heater 350 from being discharged to the outside. Accordingly, loss of heat generated from the second heater 350 can be minimized.

The second heat shield 360 may be made of ceramic. However, the material of the second heat shield 360 is not limited thereto. For example, the second heat shield 360 may be made of any known material that can effectively prevent heat loss, that is, discharge of heat.

According to the first exemplary embodiment, after the plate disposed inside the mold 100 is heated to a predetermined temperature, the mold 100 is then moved to the forming part 500 from the heating part 300.

Figure 8:
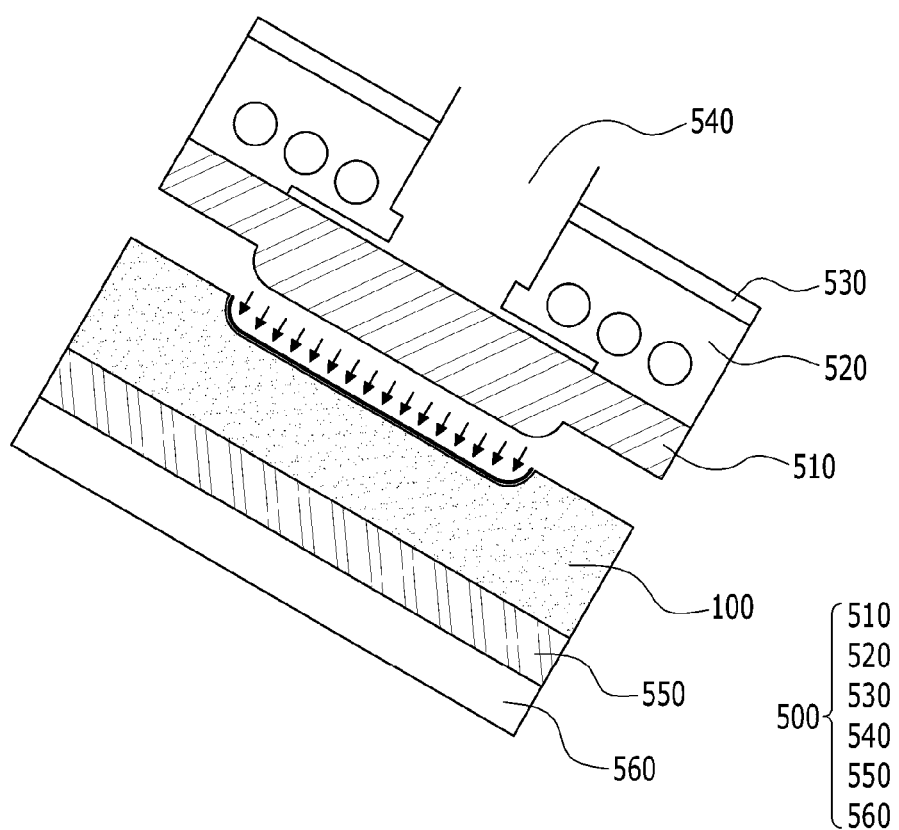
FIG. 8 is a cross-sectional view of a forming part of the apparatus of FIG. 1.

Referring to FIG. 8, the heated plate is manufactured into a specific shape in the forming part 500. After the plate is heated in the heating part 300 to a temperature at which the heated plate can be formed in a specific shape, the heated plate can be subsequently formed in the shape of the mold 100 using high-temperature gas in the forming part 500.

The forming part 500 for forming the heated plate into a specific shape includes a forming block 510, a third heating block 520, a third heater 530, a high-temperature gas supply module 540, a fourth heating block 550, and a fourth heater 560.

The forming block 510 is positioned above the mold 100 that is moved to the forming part 500. The forming block 510 jets high-temperature gas to the inside of the mold 100. When the forming block 510 jets the high-temperature gas, the heated plate disposed inside the mold 100 is formed into a shape corresponding to the concave portion of the mold 100.

Since the plate has been pre-heated in the heating part 300, the heated plate can be easily formed into a specific shape when the forming block 510 jets the high-temperature gas onto the heated plate.

The forming block 510 jets the high-temperature gas supplied from the high-temperature gas supply module 540, which will be described later. Specifically, the forming block 510 jets the high-temperature gas onto the entire area of the heated plate with uniform pressure.

The forming block 510 may be made of a porous material. For example, the forming block 510 may be made of silicon carbide. When the forming block 510 is made of a porous material, the high-temperature gas supplied from the high-temperature gas supply module 540 can be uniformly jetted onto the mold 100 without concentrating on any specific region.

The forming block 510 may be made of a metal material. A plurality of micro-holes through which the high-temperature gas can be discharged may be formed in the forming block 510.

Figure 9:
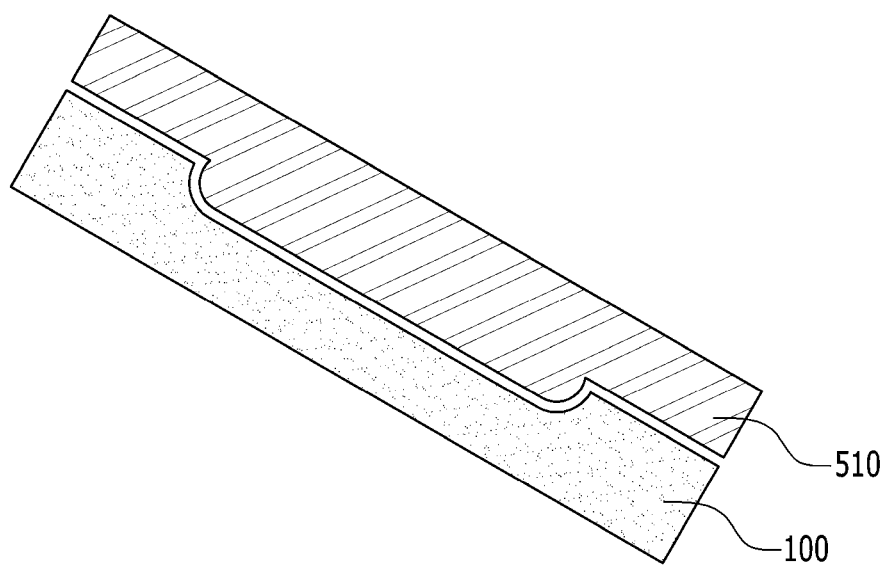
FIGS. 9 and 10 illustrate configurations in which the mold and a molding block come into contact with each other.

Referring to FIG. 9, the forming block 510 may have a convex portion having the same shape as the concave portion of the mold 100. That is, the forming block 510 has the convex portion corresponding to the shape of the final formed window. Since the forming block 510 has the convex portion, the forming block 510 can uniformly jet the high-temperature gas onto the heated plate disposed inside the mold 100.

Figure 10:
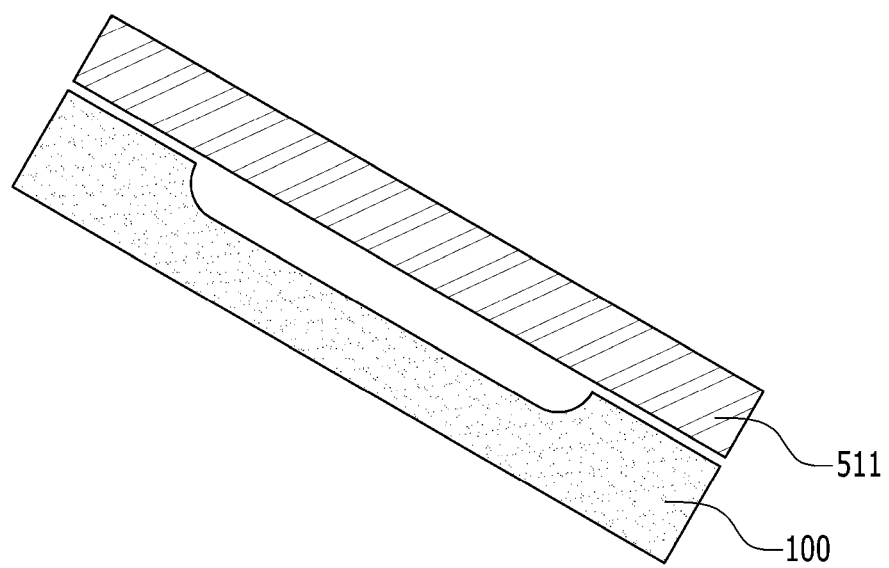

Referring to FIG. 10, a forming block 511 may be used. The forming block 511 may be provided in the shape of a flat plate. That is, the side of the forming block 511 facing the mold 100 can be flat, unlike the forming block 510 shown in FIG. 9.

Referring back to FIG. 8, the third heating block 520 is positioned on the forming block 510. The third heating block 520 is heated by the third heater 530, and transfers heat to the forming block 510 such that the forming block 510 is maintained at a predetermined temperature.

Since the third heating block 520 maintains the forming block 510 at a predetermined temperature, the heated plate can be maintained at a predetermined temperature while the heated plate is being formed into a specific shape.

The third heating block 520 may be made of at least one of the following materials: silicon carbide, stainless steel, graphite, or quartz. When the third heating block 520 is made of at least one of the above materials, heat from the third heater 530 can be uniformly transferred to the forming block 510.

The third heater 530 is positioned on the third heating block 520. The third heater 530 comes into contact with the third heating block 520 and heats the third heating block 520.

The third heater 530 may be an infrared heater. For example, the third heater 530 can be a halogen lamp.

The fourth heating block 550 is positioned beneath the mold 100. The fourth heating block 550 is heated by the fourth heater 560, and transfers heat to the mold 100 such that the mold 100 is maintained at a predetermined temperature.

The fourth heating block 550 can maintain the mold 100 at a predetermined temperature while the heated plate is being formed into a specific shape.

The fourth heating block 550 may be made of at least one of the following materials: silicon carbide, stainless steel, graphite, or quartz. When the fourth heating block 550 is made of at least one of the above materials, the fourth heating block 550 can uniformly transfer heat from the fourth heater 560 to the mold 100.

A plurality of second connection holes (not shown) are formed in the fourth heating block 550. The plurality of second connection holes are connected with the suction holes 130 of the mold 100 so as to discharge the air from the inside of the mold 100 to the outside.

The fourth heater 560 is positioned beneath the fourth heating block 550. The fourth heater 560 comes into contact with the fourth heating block 550 and heats the fourth heating block 550.

The fourth heater 560 may be an infrared heater. For example, the third heater 530 can be a halogen lamp.

According to the first exemplary embodiment, the high-temperature gas supply module 540 provides a high-temperature gas to the forming block 510. Specifically, the high-temperature gas supply module 540 generates a high-temperature high-pressure gas and supplies the high-temperature high-pressure gas to the forming block 510.

Accordingly, the forming block 510 can jet the high-temperature high-pressure gas supplied from the high-temperature gas supply module 540 to the mold 100, while maintaining a predetermined temperature by the third heating block 520.

According to the first exemplary embodiment, after the heated plate disposed in the mold 100 is formed into a specific shape, the mold 100 is moved from the forming part 500 to the cooling part 700 so as to form the window W.

Figure 11:
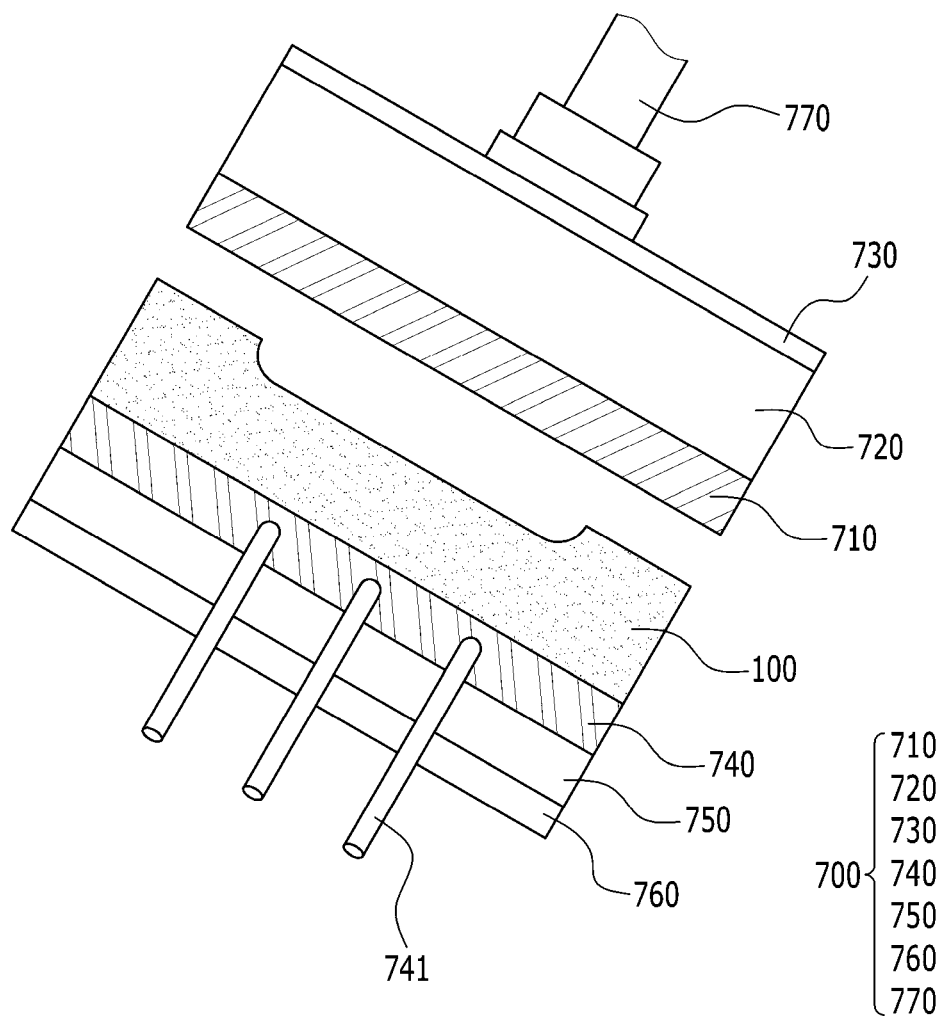
FIG. 11 is a cross-sectional view of a cooling part of the apparatus of FIG. 1.

Referring to FIG. 11, the cooling part 700 includes first and second cooling modules. The first and second cooling modules harden the formed heated plate by gradually cooling the formed heated plate. The first and second cooling modules are described in further detail as follows.

The first cooling module is positioned above the mold 100 and cools the mold 100. The first cooling module includes a first cooling block 710 and a first cooler 720.

The first cooling block 710 eliminates heat from the mold 100 and is positioned above the mold 100. The first cooling block 710 comes into contact with the first cooler 720. When the first cooler 720 gradually decreases the temperature, the first cooling block 710 in contact with the first cooler 720 is gradually cooled so as to cool the mold 100.

In some alternative embodiments, the first cooler 720 may be positioned above the mold 100 without the first cooling block 710.

The first cooling block 710 may be made of at least one of the following materials: silicon carbide, stainless steel, graphite, or quartz. When the first cooling block 710 is made of at least one of the above materials, the first cooling block 710 can uniformly eliminate heat from the mold 100.

The first cooler 720 is positioned on the first cooling block 710. The first cooler 720 is positioned in contact with the first cooling block 710 so as to reduce the temperature of the first cooling block 710.

The first cooler 720 may have the same configuration as the first heater 320. For example, the first cooler 720 may be an infrared heater. Since the mold 100 is moved from the forming part 500 at a high temperature, the mold 100 needs to be gradually cooled from the high temperature and thus the mold 100 can be cooled using the infrared heater.

A third heat shield 730 is positioned on the first cooler 720. The third heat shield 730 can prevent heat generated from the first cooler 720 from being discharged to the outside. Since the third heat shield 730 prevents heat from the first cooler 720 from being discharged to the outside, the first cooler 720 can accurately control temperature of the mold 100.

The third heat shield 730 may be made of ceramic. However, the material of the third heat shield 730 is not limited thereto. For example, the third heat shield 730 can be formed of any known material that can effectively prevent heat loss, that is, discharge of heat to the outside.

A second moving part 770 may be connected to the upper part of the third heat shield 730. The second moving part 770 can move the second cooling module. For example, the second moving part 770 can move the first cooling block 710, the first cooler 720, and the third heat shield 730, upward or downward.

For example, when the mold 100 is moved to the cooling part 700, the second moving part 770 moves the first cooling module upward. When the mold 100 is stopped at a specific position, the second moving part 770 moves the first cooling module downward.

A second cooling module for cooling the mold 100 is positioned under the mold 100. The second cooling module includes a second cooling block 740 and a second cooler 750.

Specifically, the second cooling block 740 eliminates heat from the mold 100 and is positioned beneath the mold 100. The second cooling block 740 comes into contact with the second cooler 750. When the temperature of the second cooler 750 is gradually decreased, the second cooling block 740 in contact with the second cooler 750 is gradually cooled so as to cool the mold 100.

A plurality of third connection holes (not shown) are formed in the second cooling block 740. The plurality of third connection holes are connected with the suction holes 130 of the mold 100 so as to discharge the air from the inside of the mold 100 to the outside.

The plurality of third connection holes (not shown) are connected to a pump and the like through second connection pipes 741.

The second cooling block 740 may be made of at least one of the following materials: silicon carbide, stainless steel, graphite, or quartz. When the second cooling block 740 is formed of at least one of the above materials, the second cooling block 740 can uniformly eliminate heat from the mold 100.

The second cooler 750 is positioned beneath the second cooling block 740. The second cooler 750 is positioned in contact with the second cooling block 740 so as to cool the second cooling block 740.

The second cooler 750 may have the same configuration as the first cooler 720. For example, the second cooler 750 may include an infrared heater. Since the mold 100 is moved from the forming part 500 at a high temperature, the mold 100 needs to be gradually cooled and thus the mold 100 can be cooled using the infrared heater.

A fourth heat shield 760 is positioned beneath the second cooler 750. The fourth heat shield 760 can prevent heat generated form the second cooler 750 from being discharged to the outside. Since the fourth heat shield 760 prevents heat from the second cooler 750 from being discharged to the outside, the second cooler 750 can accurately control temperature of the mold 100.

The fourth heat shield 760 may be formed of a ceramic. However, the material of the fourth heat shield 760 is not limited thereto. For example, the fourth heat shield 760 can be made of any known material that can effectively block heat loss, that is, radiation of heat to the outside.

Referring to FIG. 12, the transfer part 900 sequentially moves the mold 100 to the heating part 300, the forming part 500, and the cooling part 700.

The transfer part 900 includes a pair of rails 910. As shown in FIG. 12, the pair of rails 910 extend in one direction.

As described above, the heating part 300 is disposed in the region I of the rails 910. The forming part 500 is disposed in the region II of the rails 910. The cooling part 700 is disposed in the region III of the rails 910.

That is, the heating part 300, the forming part 500, and the cooling part 700 are respectively disposed in the regions I, II, and III of the rails 910. The mold 100 is sequentially moved and positioned in the regions I, II, and III of the rails 910, respectively.

Fixing grooves 930 for fixing the mold 100 are formed in the regions I, II, and III of the rails 910. The mold 100 is fixed to the fixing grooves 930 formed in the regions I, II, and III while moving along the rails 910 such that the corresponding processing step is performed on the mold 100.

According to the first exemplary embodiment, the mold 100 is lifted upward from the pair of rails 910 when moving along the pair of rails 910 so that friction is not generated between the mold 100 and the rails 910.

Referring to FIG. 12, when the mold 100 is in a first mold configuration 100A, the mold 100 is fixed to the fixing grooves 930 formed in the region I corresponding to the heating part 300. The mold 100 is heated by the first and second heating modules of the heating part 300 while being fixed to the fixing grooves 930.

Subsequently, the mold 100 is moved into a second mold configuration 100B. Specifically, the mold 100 in region I is lifted upward, separated from the fixing grooves 930, and moved to the region II corresponding to the forming part 500 while being spaced upward from the pair of rails 910 by a predetermined distance. Upon reaching the region II, the mold 100 is fixed to the fixing grooves 930 formed in the region II.

Lastly, the mold 100 is moved into a third mold configuration 100C. Specifically, the mold 100 is moved from the region II to the region III in which the cooling part 700 is located. Upon reaching the region III, the mold 100 is fixed to the fixing grooves 930.

Figure 13:
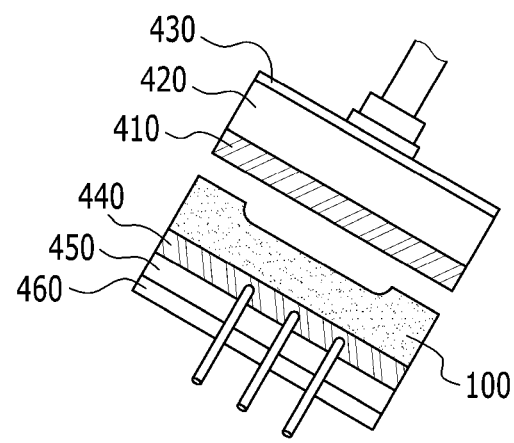
FIG. 13 is a schematic diagram of an apparatus for manufacturing a window according to a second exemplary embodiment.
Figure 13:
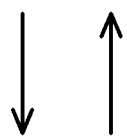
Figure 13:
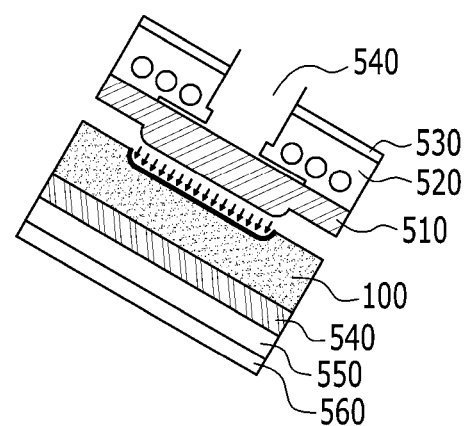

FIG. 13 is a schematic diagram of an apparatus for forming a window according to a second exemplary embodiment.

The apparatus according to the second exemplary embodiment includes components identical or similar to those of the apparatus according to the first exemplary embodiment. Accordingly, a repeat description of those identical or similar components is omitted.

The apparatus according to the second exemplary embodiment may include the mold 100, the heating part 300, the forming part 500, the cooling part 300, and the transfer part 900, similar to the first exemplary embodiment.

In the first exemplary embodiment, the heating part and the cooling part are separate components. Unlike the first exemplary embodiment, the heating part and the cooling part in the second exemplary embodiment are formed of a same component. In other words, the aforementioned component in the second exemplary embodiment can simultaneously perform both a heating function and a cooling function.

Specifically, a temperature control part 400 in the second exemplary embodiment can simultaneously perform both the heating and cooling functions. Accordingly, the apparatus according to the second exemplary embodiment is simplified compared to the apparatus according to the first exemplary embodiment.

In the first exemplary embodiment, the mold 100 is sequentially moved to the heating part 300, the forming part 500, and the cooling part 700. In contrast, in the second exemplary embodiment, the mold 100 is heated by the temperature control part 400, moved to the forming part 500, and then returned to the temperature control part 400 and cooled therein.

Referring to FIG. 13, according to the second exemplary embodiment, the temperature control part 400 includes first and second temperature control modules.

The first and second temperature control modules can heat or cool the mold 100.

The first temperature control module is positioned above the mold 100 and can heat or cool the mold 100. The first temperature control module includes a first temperature control block 410 and a first temperature controller 420.

Specifically, the first temperature controller 420 for heating or cooling the mold 100 is located above the mold 100. The first temperature controller 420 can heat or cool the mold 100 using radiation. The first temperature controller 420 may include an infrared heater. For example, the first temperature controller 420 can be a halogen lamp.

Although FIG. 13 illustrates the first temperature control block 410 being positioned between the mold 100 and the first temperature controller 420, the inventive concept is not limited thereto. In some other embodiments, the first temperature control block 410 may be omitted, and the first temperature controller 420 may directly heat or cool the mold 100.

The first temperature control block 410 may be positioned between the mold 100 and the first temperature controller 420. When the first temperature control block 410 is disposed between the mold 100 and the first temperature controller 420, the first temperature controller 420 heats or cools the first temperature control block 410 first. The temperature of the mold 100 is then uniformly increased or decreased through the first temperature control block 410.

The first temperature control block 410 may be formed of at least one of the following materials: silicon carbide, stainless steel, graphite, or quartz.

A fifth heat shield 430 is positioned on the first temperature controller 420. The fifth heat shield 430 can prevent heat generated from the first temperature controller 420 from being discharged to the outside. Accordingly, loss of heat generated from the first temperature controller 420 can be minimized.

The fifth heat shield 430 may be made of ceramic and the like. However, the material of the fifth heat shield 430 is not limited thereto. For example, the fifth heat shield 430 can be formed of any known material that can effectively prevent heat loss, that is, radiation of heat to the outside.

A fourth moving part may be connected to the fifth heat shield 430. The fourth moving part can move the first temperature control module. For example, the fourth moving part can move the first temperature control block 410, the first temperature controller 420, and the fifth heat shield 430, upward or downward.

A second temperature control module for heating or cooling the mold 100 is positioned beneath the mold 100. The second temperature control module includes a second temperature control block 440 and a second temperature controller 450.

Specifically, the second temperature control block 440 for heating or cooling the mold 100 is positioned beneath the mold 100. The second temperature control block 440 can be heated or cooled by the second temperature controller 450, and the heated or cooled second temperature control block 440 can uniformly heat or cool the mold 100. That is, the second temperature control block 440 can uniformly heat or cool the window W disposed in the mold 100, similar to the first temperature control block 410.

The second temperature control block 440 can be disposed in contact with the bottom of the mold 100. When the second temperature control block 440 is in contact with the mold 100, the second temperature control block 440 can uniformly control the temperature of the mold 100.

A plurality of fourth connection holes (not shown) are formed in the second temperature control block 440. The plurality of fourth connection holes are connected with the suction holes 130 of the mold 100 so as to discharge the air from the inside of the mold 100 to the outside.

The plurality of fourth connection holes (not shown) are connected to a pump and the like through third connection pipes.

The second temperature control block 440 may be formed of at least one of the following materials: silicon carbide, stainless steel, graphite, or quartz.

The second temperature controller 450 is positioned under the second temperature control block 440. The second temperature controller 450 comes into contact with the second temperature control block 440 and heats or cools the second temperature control block 440.

The second temperature controller 450 may include an infrared heater. For example, the second temperature controller 450 can be a halogen lamp.

A sixth heat shield 460 is positioned under the second temperature controller 450. The sixth heat shield 460 can prevent heat generated from the second temperature controller 450 from being discharged to the outside. Accordingly, loss of heat generated from the second temperature controller 450 can be minimized.

The second temperature controller 450 may be made of ceramic and the like. However, the material of the second temperature controller 450 is not limited thereto. For example, the second temperature controller 450 can be formed of any known material that can effectively prevent loss of heat, that is, heat radiation to the outside.

Figure 14:
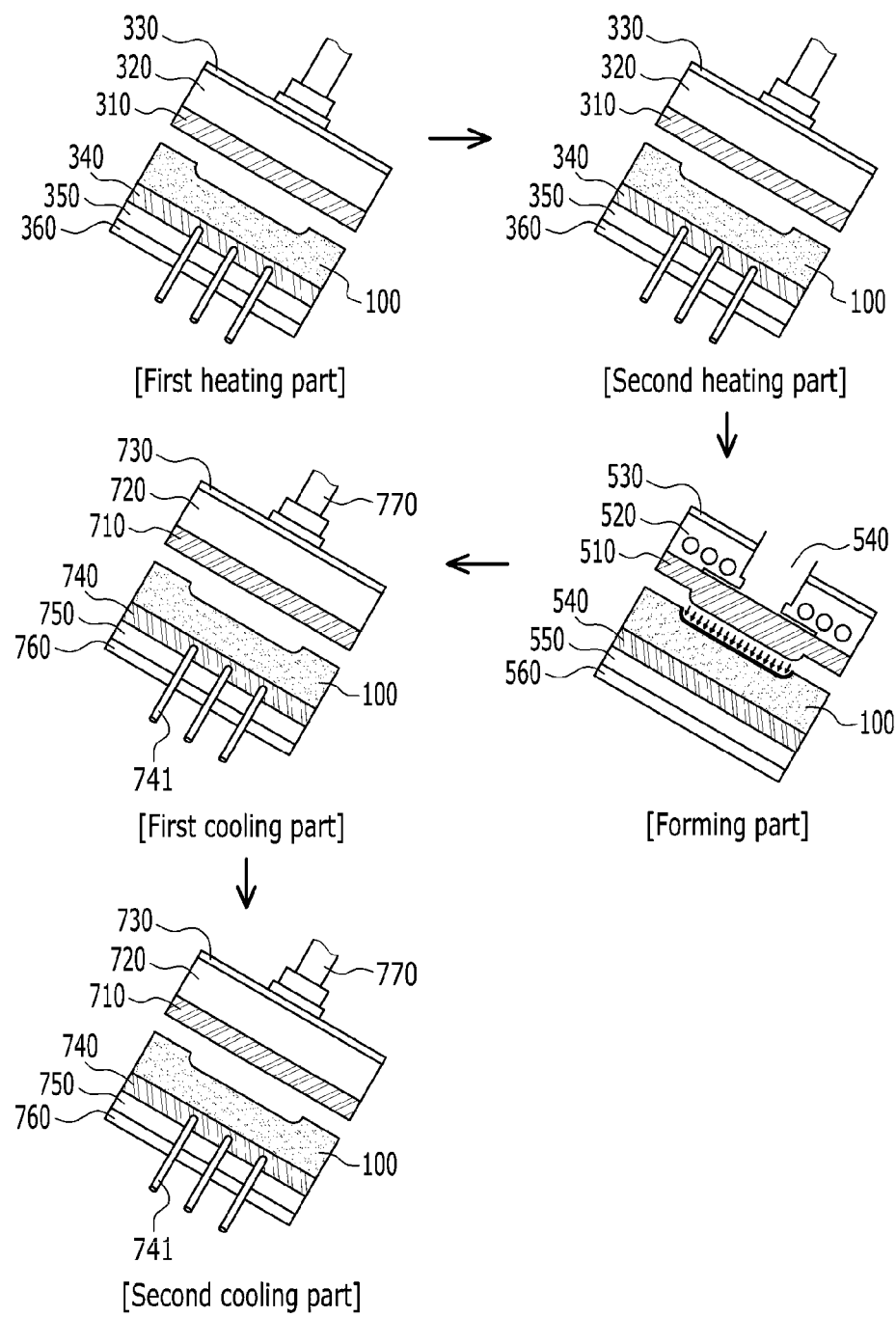
FIG. 14 is a schematic diagram of an apparatus for manufacturing a window according to a third exemplary embodiment.

FIG. 14 is a schematic diagram of an apparatus for forming a window according to the third exemplary embodiment.

The apparatus according to the third exemplary embodiment includes components identical or similar to those of the apparatus according to the first exemplary embodiment. Accordingly, a repeat description of those identical or similar elements is omitted.

The apparatus according to the third exemplary embodiment may include the mold 100, the heating part 300, the forming part 500, the cooling part 500, and the transfer part 900, similar to the apparatus according to the first exemplary embodiment.

Unlike the first exemplary embodiment, the heating part in the third exemplary embodiment includes first and second heating parts. In addition, the cooling part in the third exemplary embodiment includes first and second cooling parts.

That is, unlike the first exemplary embodiment, the apparatus according to the third exemplary embodiment may include a plurality of heating parts and cooling parts. In the third exemplary embodiment, the apparatus includes two heating parts and two cooling parts. However, it is noted that any number of heating parts and cooling parts may be contemplated.

According to the third exemplary embodiment, a time required for heating the mold 100 can be reduced since the apparatus includes the first and second heating parts. For example, when a temperature for heating the window W is set to 100° C. in the apparatus according to the first exemplary embodiment, the heating part 300 in the first exemplary embodiment directly heats the window W to 100° C. In contrast, in the third exemplary embodiment, the first heating part can heat the window W to 50° C. and the second heating part can heat the window W to 100° C. so as to reduce heating time of the mold 100.

In addition, according to the third exemplary embodiment, a time required to cool the mold 100 can be reduced since the apparatus includes the first and second cooling parts.

Using the apparatus disclosed in one or more of the above exemplary embodiments, a window W can be formed with both sides having the same width since the mold 100 is tilted at a predetermined angle relative to a horizontal plane during the manufacturing process.

Also, the apparatus according to one or more of the above exemplary embodiments can heat or cool the mold using one temperature control part, and thus the equipment/apparatus can be simplified.

In addition, the apparatus for forming a window according to one or more of the above exemplary embodiments can reduce heating time and cooling time by using a plurality of heating parts and cooling parts.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. An apparatus for forming a window of a display panel, comprising:
  a mold having a concave portion formed therein and configured to hold a plate in the concave portion, wherein the concave portion has a predetermined shape; and
  a transfer part configured to sequentially transfer the mold to a heating part, a forming part, and a cooling part;
  wherein the heating part includes a first heating module and a second heating module respectively positioned on a top portion and a bottom portion of the mold, and wherein the first and second heating modules are configured to apply heat to the top and bottom portions of the mold so as to heat the plate;
  wherein the forming part is configured to receive the mold transferred from the heating part to the forming part by the transfer part, wherein the forming part includes a first forming portion and second forming portion respectively positioned on a top portion and a bottom portion of the mold, and wherein the first forming portion is configured to jet a high-temperature gas onto the heated plate, so as to form the heated plate into the predetermined shape;
  wherein the cooling part is configured to receive the mold transferred from the forming part to the cooling part by the transfer part, wherein the cooling part includes a first cooling module and second cooling module respectively positioned on the top and bottom portions of the mold, and wherein the first and second cooling modules are configured to cool the top and bottom portions of the mold, so as to cool the heated plate and thereby form the window having the predetermined shape; and, wherein the mold is tilted at a predetermined angle relative to a horizontal plane of the heating part, the forming part, and the cooling part, wherein the transfer part includes a pair of rails, and the pair of rails includes fixing grooves for fixing the mold in place.

2. The apparatus of claim 1, wherein the mold includes a stopper for supporting an edge portion of the plate or window, so as to prevent the plate or window from moving downward.

3. The apparatus of claim 1, wherein the predetermined angle ranges from about 00 to about 300.

4. The apparatus of claim 1, wherein the mold includes a plurality of suction holes formed in the concave portion.

5. The apparatus of claim 4, wherein the first heating module includes a heater positioned above the mold for heating the mold, and a heating block positioned between the mold and the heater for heating the mold using heat transferred from the heater.

6. The apparatus of claim 5, wherein the second heating module includes a heating block positioned under the mold for transferring heat to the mold, and a heater positioned under the heating block of the second heating module for heating the heating block of the second heating module.

7. The apparatus of claim 6, wherein the heating blocks are formed of at least one of silicon carbide, stainless steel, graphite, and quartz.

8. The apparatus of claim 6, wherein the heaters are infrared heaters.

9. The apparatus of claim 6, further comprising:
a heat shield positioned on each heater.

10. The apparatus of claim 6, wherein the heating block of the second heating module includes a plurality of connection holes connected with the suction holes of the mold.

11. The apparatus of claim 1, wherein the forming part further comprises:
a forming block positioned on the first forming portion and including a plurality of injection holes through which the high-temperature gas is jetted;
a heating block positioned on the forming block for transferring heat to the forming block;
a heater positioned on the heating block for heating the heating block;
a high-temperature gas supply module connected to the forming block for supplying the high-temperature gas to the forming block;
a heating block positioned on the second forming portion for transferring heat to the mold;
and a heater positioned on the heating block of the second forming portion for heating the heating block of the second forming portion.

12. The apparatus of claim 11, wherein the forming block has a convex portion corresponding to the predetermined shape.

13. The apparatus of claim 1, wherein the heating temperatures of the heating part increases in a direction in which the mold is transferred.

14. The apparatus of claim 1, wherein the cooling temperatures of the heating part decrease in a direction in which the mold is transferred.

15. The apparatus of claim 1, wherein the heating part, the forming part, and the cooling part are positioned along the pair of rails.

16. The apparatus of claim 15, wherein the mold is lifted by a predetermined distance from the fixing grooves when the transfer part transfers the mold from the heating part to the forming part, and from the forming part to the cooling part.

17. An apparatus for forming a window of a display panel, comprising:
a mold having a concave portion formed therein and configured to hold a plate in the concave portion, wherein the concave portion has a predetermined shape; and
a transfer part configured to transfer the mold between a temperature control part and a forming part;
wherein the temperature control part includes a first temperature control module and a second temperature control module respectively positioned on a top portion and a bottom portion of the mold, and wherein the first and second temperature control modules are configured to heat the top and bottom portions of the mold so as to heat the plate;
wherein the forming part is configured to receive the mold transferred from the temperature control part to the forming part by the transfer part, and wherein the forming part is positioned above the mold and configured to jet a high-temperature gas onto the heated plate, so as to form the heated plate into the predetermined shape,
wherein the temperature control part is further configured to receive the mold transferred from the forming part to the temperature control part by the transfer part, and wherein the first and second temperature control modules are configured to cool the top and bottom portions of the mold, so as to cool the heated plate and thereby form the window having the predetermined shape,
wherein the mold is tilted at a predetermined angle relative to a horizontal plane of the temperature control part and the forming part and
wherein the transfer part includes a pair of rails, and the pair of rails includes fixing grooves for fixing the mold in place.

18. The apparatus of claim 17, wherein the first temperature control module includes:
a temperature controller positioned above the mold for heating or cooling the mold, and
a temperature control block positioned between the mold and the temperature controller for heating or cooling the mold using heat transferred from the temperature controller.

19. The apparatus of claim 18, wherein the second temperature control block module includes:
a temperature control block positioned under the mold for exchanging heat with the mold, and a temperature controller positioned beneath the temperature control block of the second temperature control block module for heating or cooling the temperature control block.

20. The apparatus of claim 19, further comprising:
a heat shield positioned on each temperature controller.

* * * * *